W. A. TANGEMAN.

Knitting-Machines.

No. 5,552. Reissued August 26, 1873.

Witnesses.
Phil. H. Larner
Geo. F. Stenz

Inventor.
William A. Tangeman
By Wm. C. Wood
Attorney

AM. PHOTO-LITHOGRAPHIC Co. N.Y. (OSBORNE'S PROCESS)

UNITED STATES PATENT OFFICE.

WILLIAM A. TANGEMAN, OF LOCKLAND, OHIO.

IMPROVEMENT IN KNITTING-MACHINES.

Specification forming part of Letters Patent No. 85,546, dated January 5, 1869; reissue No. 5,552, dated August 26, 1873; application filed October 22, 1872.

*To all whom it may concern:*

Be it known that I, WILLIAM A. TANGEMAN, of Lockland, in the county of Hamilton and State of Ohio, have invented certain new and useful Improvements in Knitting-Machines.

My invention consists in a novel construction, combination, and arrangement of the needle-operating cams; and I do hereby declare that the following specification, taken in connection with the accompanying drawings and forming a part of the same, is a clear, true, and exact description of a knitting-machine, cam-plate, and cams embodying the several features of my invention.

Figure 1:
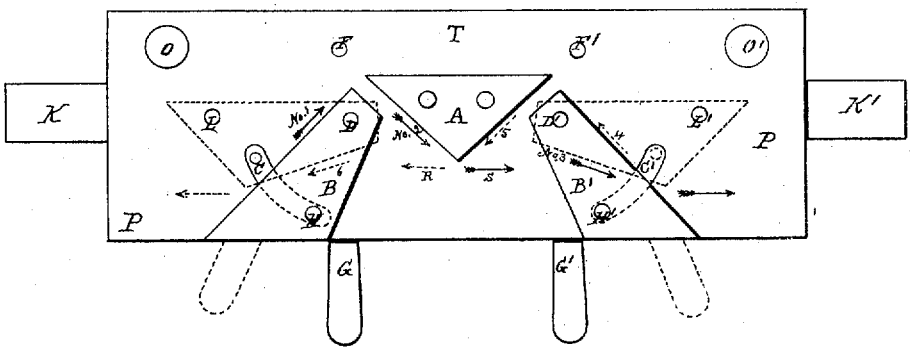
Figure 2:
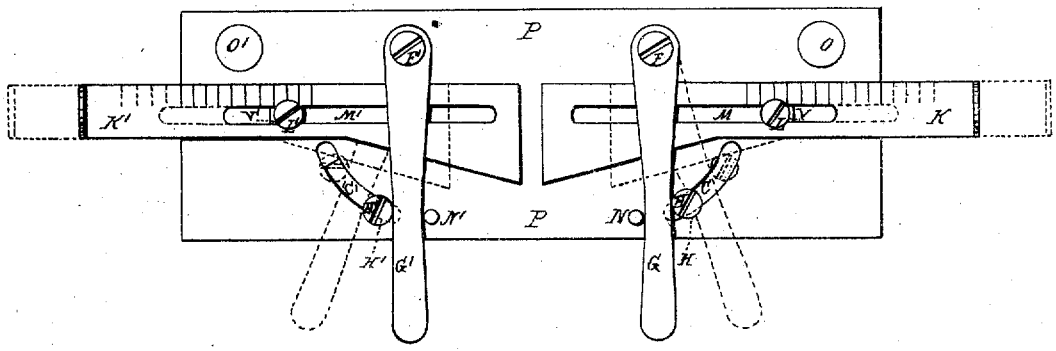

Figure 1 represents the cam-plate as if detached from the machine, and reversed, exposing the operative cams. Fig. 2 represents the front view of the plate as if in working position on a machine.

Some of the advantages arising from the use of my improvements are: First, they enable a knitting-machine capable of knitting a tubular fabric to complete the stocking automatically, instead of making the same by removing the loops and joining parts of the stocking together when removed from the machine; second, the cam-stops at the ends of the machine, as at present used, are dispensed with; third, it requires less power to run the machine, and there is also less liability to lose the first stitch in any particular row, as will be more particularly described hereafter.

P denotes the cam-plate, to which the several operating cams and the devices for controlling them are attached. A denotes the V-shaped or triangular main cam. It is similar to others of its class long in use, but differs in this connection from all others heretofore known to me in having an open space, T, parallel with its horizontal base-line, and extending to the adjacent edge of the cam-plate for a purpose hereafter more fully described. B and B′ denote two wing-cams located one on each side of the triangular cam A. Both are loosely secured to the cam-plate by pivots D and D′. C and C′ denote curved slots in the cam-plate P, by which the movement of the wing-cams may be limited. Each wing-cam is provided with a screw-stud, H or H′, which projects from the cam into and through the curved slot C, and extends beyond the face-line of the cam-plate. G and G′ denote two swinging levers secured at their upper ends to the outer face of the cam-plate P by screw-pivots F and F′. These levers are slightly offset and are removed from contact with the cam-plate at the pivots by means of washers. When at right angles to the longitudinal line of the cam-plate the levers are adjacent to the lower ends of the curved slots C C′, and in contact with the screw-studs H and H′ of the cams B B′. K and K′ denote two graduated slides attached to the outside of the cam-plate P on a central longitudinal line by means of screw-studs L L′ passing through their slots M M′, and entering the cam-plate through guide-plates V V′ fitted to the slots. Each slide is a little longer than half the length of the cam-plate, and extends in opposite directions horizontally on the same line from a point near the center, passing under one of the levers G G′. The adjacent or inner ends of the slides K and K′ are widened, and their lower edges are inclined for about half their length from the widened ends upward to the narrow or straight portion.

When the levers G and G′ are pushed in the direction of the dotted lines shown in Fig. 2, they press against the screw-studs H and H′, which are attached to the wing-cams, raising the said studs to the position shown by the dotted lines in Fig. 2, or so far as the graduated slides K K′ will permit, thereby removing the wing-cams from contact with the needle-shanks. When, however, the levers G G′ are placed in the position shown in full lines in Fig. 2—that is, at right angles, or nearly so, to the slides K K′—the wing-cams are in position to act upon the needles. Stops or rivets N N′ are used as resting-places for the levers G G′ to sustain the wing-cams against the pressure of the needle-shanks as they pass up the outer slope while the cam-plate is being moved in the direction of the needles to be operated. When the slides K and K′ are drawn out from the plate—that is, in the direction of the dotted lines in Fig. 2—these inclined edges come in contact with the studs H H′, (when the levers G are swung to occupy positions, as shown by the dotted lines,) and press them down through the slots C C′ in the direction of the rests N N′. The slides K K′ are provided with a graduated scale, as shown in Fig. 2, so that both may be so fixed that the studs H H′ of the wing-cams may not rise more than a given distance from their respective levers G G′. When the studs H H′, by this or equivalent means, are prevented from going to the full extent of the slots C C′, of course, the wing-cams, from which they project, are also prevented from moving any farther, and the graduated scales will measure or mark the exact distance to which the wing-cams may pass from the levers G G′. The lower edges of the slides K K′ are so inclined that when drawn out they will remain stationary at any given point, resisting the pressure of the wing-cams without the aid of screws or other special means to fasten them. The cam-plate P is attached to the cam-carriage of a knitting-machine by means of screws through the holes shown at O O′. When the plate is attached to the machine, the force of gravity will always bring the wing-cams down when they are freed from the upward pressure of the shanks of the needles.

I will describe my improvement as attached to a machine having a double row of needles, and capable of knitting a tubular fabric.

In describing the operation of my improvements the several cams, cam-plate, &c., as a whole, will, for convenience, be designated the "lock" of the machine.

When the machine is put into operation, (the needles occupying the position in which they are usually placed before commencing operation,) if the reciprocating-carriage is so placed that the lock herein described is on the left-hand end of the machine, on the side toward the operator, as it commences its route to the right hand of the machine, the lower right-hand corner of the wing-cam B catches the shanks of the needles, and as the cam-plate is carried to the right hand the needles are forced up the inclined plane in the direction of the arrow No. 1, as shown at Fig. 1, until they reach the top of the cam. They remain stationary at this point until the forward motion of the cam-plate brings the V-shaped cam A against them, when the pressure of that cam will force them down in the direction of the arrow No. 2, until they arrive at the lowest point of said cam, where they will remain stationary until the continued forward motion of the carriage brings the wing-cam B′ against them, which they, by their pressure, will force up so far as the slide K′ will permit the stud H′ to go, when the cam will rest, firmly supported by said slide; or, if the slide is pushed in toward the center of the lock as far as it will go, said cam will be supported by the end of the slot C′ farthest removed from the rest N′. The needles will be forced by the pressure of the wing-cam B′ in the direction of the arrow No. 3 until they arrive at the bottom; and when, by the continued action of the machine, the lock is carried farther to the right, they will be left in a row parallel to the length of the cam-plate. After all the needles in operation have thus been passed by the second cam B′ it will, by the force of gravity, fall into the position shown in Fig. 1. When the machine is reversed the needles will travel in the direction shown by the arrows Nos. 4, 5, and 6, and be operated by similar forces, except that when the carriage travels to the left the wing-cam B′ will perform the functions that the wing-cam B performed when the carriage traveled to the right, and the left side of the V-shaped cam performs the functions that the right side performed, and the wing-cam B performs the same functions that the wing-cam B′ did, as previously explained.

It is evident that when the slides K K′ are drawn out in the direction of the dotted lines shown at Fig. 2, they will, by their contact with the studs H H′, prevent the wing-cams from rising so far, by the pressure of the needles against them, as they otherwise would, and that in such case the needle-shanks are forced farther down on the plate P—that is, they are forced down a greater distance from the highest point they have reached—and will therefore make a longer stitch, so that the length or tightness of the stitch depends upon the distance the wing-cams are forced up, and that may be easily determined by any skillful operator by the graduated slides K K′.

So far the description of the operation of the machine has been confined to the knitting of straight pieces; but when tubular work is desired, one set of needles knits from right to left only, and the opposite or parallel set knits from left to right only, so that the result of a motion of the carriage to the left and back again to the right is to make one complete row of stitches around the stocking or other tubular structure. In order to accomplish this it is only necessary that the lever G′ be pressed in the direction shown by the dotted lines in Fig. 2, so as to carry up the cam B′. In that case, when the lock is carried from left to right, the wing-cam B being free to act upon the needle-shanks, half of the circle will be knit, while, when the cam-carriage is reversed, the cam B′, being removed above the plane of the needle-shanks, as before described, will pass over them without knitting; but when the carriage is reversed, the wing-cam upon the opposite lock, and immediately opposite the wing-cam B′, will be brought into a position to act upon the opposite row of needles, and, while the wing-cam B′ returns without knitting, the opposite lock will complete the circle. So, also, while the wing-cam B is knitting, the wing-cam upon the other lock, and immediately opposite to it, will be raised above the plane of the needle-shanks, as in the case of the cam B′, and will not knit. Thus when the knitting-machine is in operation, making tubular work, but one cam on each lock will be in a condition to act on the needles, and the cams acting upon the needles will be those that are located diagonally to each other.

When the knitting-machine is operated as just described it will knit plain tubular work. This might have been done without the aid of my improved lock; but I will now describe the manner in which, by the aid of my improved lock, heels of stockings or other similar curves may be knit.

For this purpose the space T is provided above the upper part or base of the main cam A, parallel with the upper edge of the cam-plate, as shown in Fig. 1. It is plain that when any needles are drawn so far up in the machine that the shanks of such needles are in such space, and above contact with the V-shaped cam, such needles can take no part in the work of the machine, which must then be operated with the remaining needles.

When the stocking has been commenced at the toe, and the tube has progressed so far that it is necessary to commence the heel or other curve, one of the sets of cams is, by the levers G or G′, prevented from operating its row of needles, while the other row of needles and accompanying lock knit the heel or other curve. To do this, an equal number of the needles is drawn up on each end of the needle-plate of the machine, so that their shanks are in line with the space T, and so that the needles, between those drawn up, are subject to be acted upon by the lock. One row is then knit with these intermediate needles—say, from left to right—and when the carriage has moved to the right of the machine, one of the needles, previously drawn up at the left, and the one which is next to the needles that are in operation, is pushed down, so as to be in a position to knit when the carriage is moved to the left, and one (being the one which is next to the needles that are in operation) of the needles at the right, is pushed down, and again the carriage moves to the right, when the next succeeding needle is brought into operation upon the other side; and so the needles are brought successively into operation one after each movement of the carriage, until all are brought into operation. This process will produce a curve or a part of curve, and the extent or amount of curvature will depend on the number of needles that are drawn up on each side, the greater curvature being produced by drawing up a greater number of needles.

When the needles are first drawn up to knit a curve, the proper number to be taken up at each end for the heel of an ordinary stocking will be about one-sixth of the whole number in one of the straight rows of nedles, or about one-third in all; but as different operators would desire to knit different-shaped heels, and as the amount of curve will always depend on the number of needles drawn up, it is impossible to give a definite rule suited to all cases. When the needles have been all been pushed down, they are again drawn up in the same way as before, and the operation above described is repeated until the curve, having extended nearly or quite to the corner of the heel, and it being necessary that the curve at that point should be increased, the number of needles drawn up should be increased to, say, one-fourth of the whole row on each side.

The curve here described may be varied by taking up more or less of the needles at first, and by taking up any greater or less number each time the operation is repeated, until the heel or other curve has been completed, when all the needles may be brought into operation in the manner before described, and the knitting of the tube continued.

In this description I have supposed three repetitions of this operation sufficient to form the heel of a stocking; but it is evident that the operation may be performed a greater or less number of times in the process of turning the heel, depending, of course, upon the length of the curve desired. If the stocking has been commenced on the top of the leg, then the above process would be reversed—that is, the part of the heel having the greatest amount of curvature would be bent first. Of course it will be understood that during this operation the levers G G′ of the set of cams in use are both at right angles to the plate P, so that the wing-cams will be both in operation.

There is another way in which the heel of a stocking or other similar curve may be knit by my improved cams, which is as follows: One full row of needles is put in operation, and when the carriage has passed, say, from right to left, one needle at the right is drawn up, as before described, and the carriage moved to the right, when one needle is drawn up on the left, and thus, at each motion of the carriage, one needle is removed from operation, until nearly all the needles are thus removed, when the operation is continued by adding one needle after each motion of the reciprocating carriage, as heretofore described, until all the needles are again in operation. The result will be a piece, which, if laid flat, would be nearly in the form of two isosceles triangles joined together at the angles opposite their respective bases; but as the needles come into operation, as before described, after forming the first triangle, they commence to form the tube, and, when the needles are all in operation, the heel will be formed. The shape of the heel will depend on how near the piece would take the form of two triangles if it were a straight piece; or, in other words, it depends on how many of the needles are drawn up before they are again brought successively into operation.

It will be found that it requires much less power to work a knitting-machine having my improvements than one operated by the cams heretofore in use, and for this reason, that after the needles have ceased to be operated upon by the V-shaped cam, they remain stationary until they are again operated upon by the proper wing-cam, because they must remain in the plane of the arrows R and S, shown in Fig. 1, until the motion of the cam-carriage toward them brings the proper wing-cam against them. While they are standing thus the hook of the needle is in the proper position to receive the yarn from the eye of the yarn-feeder, and the carriage has progressed so far as to carry the eye of the yarn-feeder a considerable distance, in the direction in which it may be going, past the hook of the particular needles then at rest. This motion of the carriage will take up the slack of the yarn, if there is not more in slack than the distance between the eye of the yarn-feeder (when it has progressed as described) and the hook of the needle just before, or at the time it is first touched by the second wing-cam, and at the point of time when the yarn is fed into the hook of the needle, the yarn will be sufficiently tight to be caught by the hook, so as to prevent the hook from slipping past the yarn (of which there is danger when there is slack in the yarn) when it is about to be caught by the hook of the needle; and, by permitting the needles to remain at the point indicated (that is, after they have been acted upon by the V-shaped cam, and before they have been acted upon by the proper wing-cam,) a sufficient length of time for the yarn-feeder to take up the slack of the yarn, the advantage above noted is secured; and the greater the distance between those points, the more of the slack may be taken up. When the yarn is fed loosely to the machine, there will be, at the commencement of each row to be knitted a certain amount of slack yarn, which will have a tendency to cause the loss of one or more stitches at the commencement of each row, and to avoid such loose or slack yarn, the yarn to be fed into the needles must be stretched more tightly; but in order to do this, a considerable increase of power would be required to run the machine, and at the same time take the yarn from the apparatus used to hold it. But it is desirable that the yarn shall run loosely, and thereby save power; and, as a complement to the efficiency of a knitting-machine thus run, it is necessary that there be mechanism to take up the slack of the yarn before the first needles of a row are fed, and the mechanism above described answers that purpose. It is further evident that, by increasing the time during which the needles are at rest, as before described, which may be done by increasing the distance between the wing-cams and the V-shaped cam, a greater amount of slack in the yarn may be permitted.

It is important to the successful operation of my improvements, for the purpose just described, that the V-shaped cam should be of sufficient altitude to carry the needles so far down, before they are permitted to remain at rest, that they will be in the proper position to receive the yarn. The proportion shown in Fig. 1 will answer that purpose very well.

An important advantage arising from the use of my improved cams is this: That when the needles are drawn up above the V-shaped cam, as before described, and it is desired to bring the needles, or any of them, into operaton, the V-shaped cam will take hold of the needle-shanks at a higher point on the needle-bed than the cams heretofore used, and draw them into operation—that is, my cams will take hold of the needle-shanks when they have been pressed down into the plane of the V-shaped cam, and draw them down to the point of the cam, where they remain at rest, as before described, in order that the yarn-carrier may tighten the yarn, and yet not draw them down so far that they would lose their stitches—while, with all other similar cams in use prior to my invention, if the needles were pushed so far that the shanks would be caught by the operative mechanism, the needles would be drawn so far that they must lose their stitches; and this advantage I regard as one of the essential features of my invention. It will, however, be evident to any skillful mechanic that this feature of my invention could be easily retained, and yet the form of the mechanism be greatly varied. Thus a channel or lane might be cut in a nearly diagonal direction through the wing-cams in common use, and the needle-shanks arranged to pass through that lane instead of going all the way down the wing-cam, and then around the V-shaped cam past its apex, to a point about half-way down the V-shaped cam upon the opposite side, where the lane would commence in the other wing-cam, and where the needle might easily be made to rest, by appropriate mechanism, until the yarn-feeder had taken up the slack of the yarn.

Other modifications of my invention herein described would easily suggest themselves to any skillful mechanic.

Having thus described my invention, what I claim as new, and desire to secure by Letters Patent, is—

1. A triangular needle-cam, A, mounted on the cam-plate, with its base toward the hooks of the needles, and having a space, T, above its base-line for the reception of the heels of the needles, and arranged between movable cams, also acting on the needles, in a machine capable of knitting a tubular fabric, substantially as described.

2. The graduated sliding bars K K′, as and for the purposes described.

3. The levers G G′, as and for the purposes described.

4. The combination, with a knitting-machine having two parallel straight rows of needles, of a set of cams or lock, constructed and operating substantially as described, so that a portion of the needles may be elevated so as not to operate, and yet so as not to interfere with the proper working of the needles that are in operation for knitting the heels of stockings or other curves.

5. The V-shaped cam A, constructed and arranged with reference to the wing-cams, as shown, for the purpose of permitting the needles to remain at rest, so that the slack of the yarn may be taken up, and power saved.

6. The devices herein described, arranged and operating as shown, to draw the needles down to such a point that they are in a proper position to receive the yarn without drawing them down so far that they would lose their stitches.

W. A. TANGEMAN.

Witnesses:
A. W. ROHUN,
JUDSON HARMON.